(12) United States Patent
Chiang et al.

(10) Patent No.: US 7,609,529 B2
(45) Date of Patent: Oct. 27, 2009

(54) PANEL ASSEMBLY STRUCTURE (75) Inventors: Jung-Sheng Chiang, Taipei (TW); Po-An Lin, Taipei (TW); Wen-Yi Huang, Taipei (TW)

(73) Assignee: Compal Electronics, Inc., Taipei (TW)

( * ) Notice: Subject to any disclaimer, the term of this patent is extended or adjusted under 35 U.S.C. 154(b) by 501 days.

(21) Appl. No.: 11/456,212

(22) Filed: Jul. 10, 2006

(65) Prior Publication Data
US 2007/0134955 A1  Jun. 14, 2007

(30) Foreign Application Priority Data
Dec. 12, 2005  (TW) ............................. 94143847 A (51) Int. Cl.
*H05K 7/02* (2006.01)
*H05K 7/04* (2006.01)
(52) U.S. Cl. ....................... 361/810; 361/729
(58) Field of Classification Search ................ 361/752, 361/800, 797, 790, 810, 729
See application file for complete search history.

(56) References Cited

U.S. PATENT DOCUMENTS

| | | | |
|---|---|---|---|
| 6,002,457 A | 12/1999 | Yun et al. | |
| 6,212,067 B1 * | 4/2001 | Nakajima et al. | 361/681 |
| 6,262,888 B1 * | 7/2001 | Siedow et al. | 361/685 |
| 6,421,231 B1 * | 7/2002 | Jung | 361/681 |
| 6,789,976 B2 * | 9/2004 | Hung et al. | 403/84 |
| 7,019,967 B2 * | 3/2006 | DiFonzo et al. | 361/687 |
| 7,267,313 B2 * | 9/2007 | Krzoska et al. | 248/316.8 |

FOREIGN PATENT DOCUMENTS

| | | |
|---|---|---|
| CN | 2546909 | 4/2003 |
| KR | 1020060017232 | 2/2006 |

* cited by examiner

*Primary Examiner*—Hung S Bui
(74) *Attorney, Agent, or Firm*—Jianq Chyun IP Office (57) ABSTRACT

A panel assembly structure including a first connecting portion, a first screw, a second connecting portion and a second screw for fixing a display panel on a panel cover is provided. The first connecting portion having a first connecting through hole is formed on the cover and extends toward a first side of the panel. The first screw is screwed into the first connecting through hole and a first panel threaded hole on the first side for fastening the first connecting portion and the first side. The second connecting portion having a second connecting through hole is formed on the inner surface of the cover and extends toward a second side of the panel. The second screw is screwed into the second connecting through hole and a second panel threaded hole on the second side of the panel for fastening the second connecting portion and the second side.

14 Claims, 12 Drawing Sheets

PANEL ASSEMBLY STRUCTURE

CROSS-REFERENCE TO RELATED APPLICATION

This application claims the priority benefit of Taiwan application serial no. 94143847, filed on Dec. 12, 2005. All disclosure of the Taiwan application is incorporated herein by reference.

BACKGROUND OF THE INVENTION

1. Field of Invention

The present invention relates to a panel assembly structure, and more particularly, to a display panel assembly structure in laptop computers.

2. Description of Related Art

After black-and-white TV sets in the work mode of cathode ray tubes (CRT) were developed, image display technology has been continuously progressing rapidly. However, displays in the work mode of cathode ray tubes have disadvantages such as huge volume, heavy weight, and high radiation, so new flat panel display techniques have been continuously developed. Among the flat panel display technologies, a liquid crystal display (LCD) technology having advantages of being light, thin, short and small, power saving, radiation-free, full color, and portable is the most mature and has been popularized. Portable electronic devices such as mobile phones, language translators, digital cameras, digital video cameras, personal digital assistants (PDA), laptop computers, and even the large electronic devices such as desktop displays and TV sets have employed the liquid crystal displays.

Figure 1A:
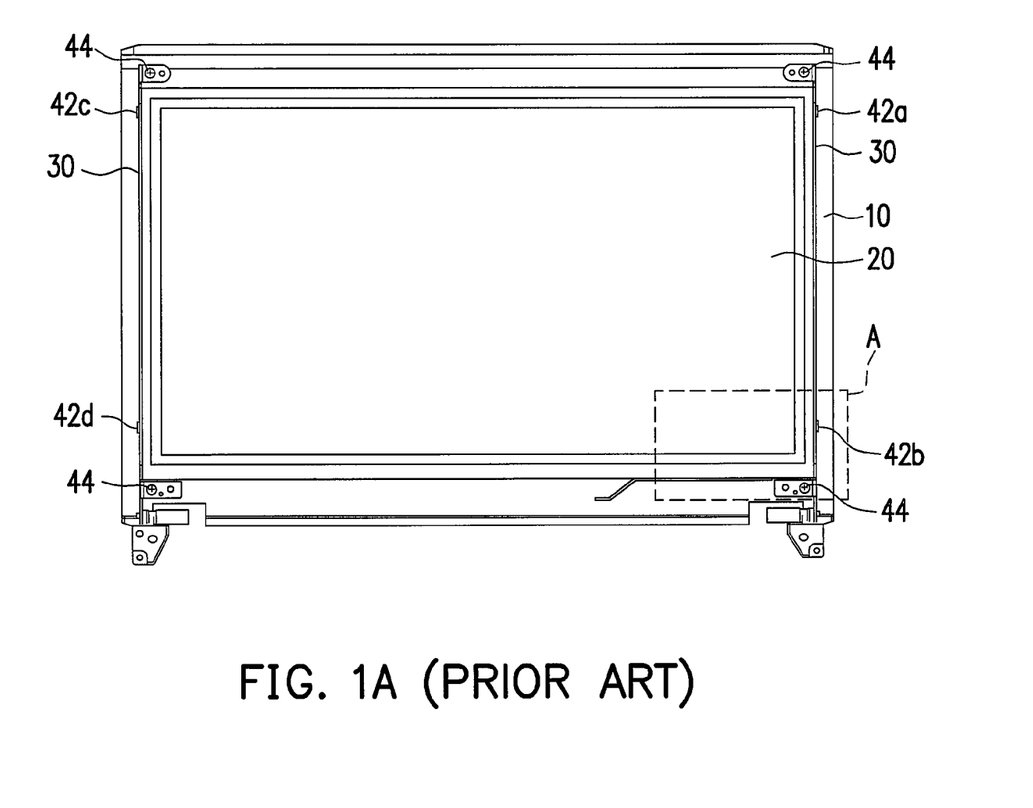
FIG. 1A is a schematic view showing a conventional liquid crystal display panel assembly structure in a laptop computer.
Figure 1B:
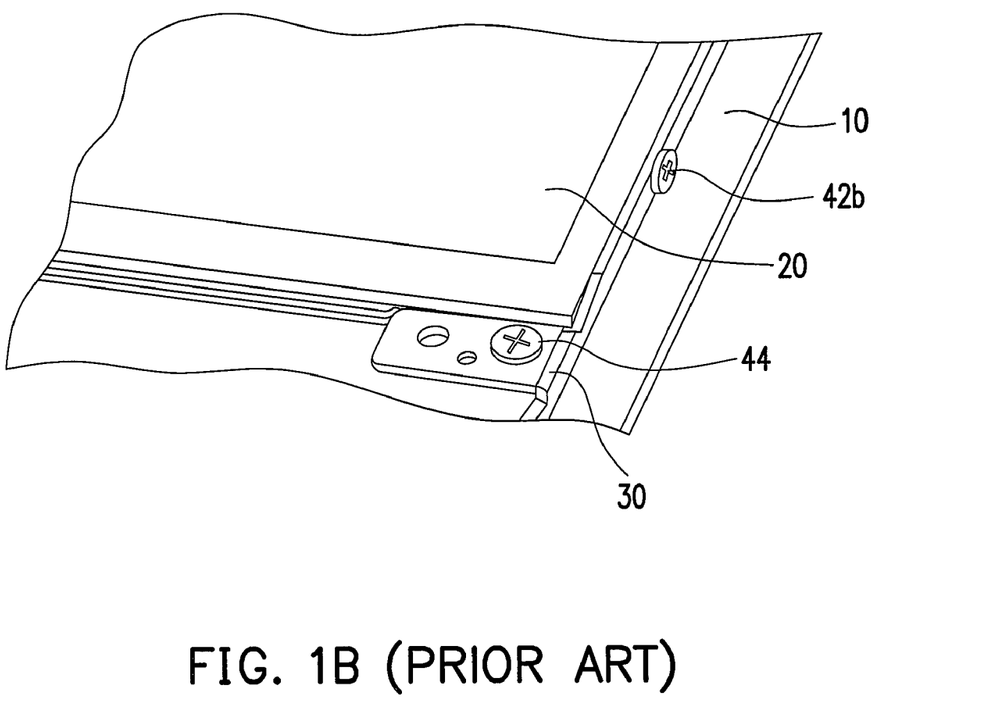
FIG. 1B is a three-dimensional view showing the Region A in FIG. 1A.

FIG. 1A is a schematic view showing a conventional liquid crystal display panel assembly structure in a laptop computer; FIG. 1B is a three-dimensional view showing the Region A in FIG. 1A. Referring to FIGS. 1A and 1B, a liquid crystal display panel 20 is disposed on an inner surface of a cover 10 of the upper body of the laptop computer, and the liquid crystal display panel 20 is fixed on the inner surface of the cover 10 by a pair of brackets 30 disposed at the left and right sides thereof.

The process of assembling the liquid crystal display panel 20 on the inner surface of the cover 10 is illustrated in following. First, a plurality of first screws 42a~42d are screwed respectively into the pair of brackets 30 and both sides of the liquid crystal display panel 20, such that the both sides of the liquid crystal display panel 20 are fixed on the pair of brackets 30, respectively. Then, the brackets 30 are fixed on the inner surface of the cover 10 by a plurality of second screws 44, such that the liquid crystal display panel 20 is fixed on the inner surface of the cover 10 through the pair of brackets 30.

However, the above-mentioned method for assembling the liquid crystal panel still has the following disadvantages.

1. Since the pair of brackets are usually made of metal, the arrangement of the pair of brackets results in an increase in total weight of the laptop computer, however, it is against the development of the light laptop computer.

2. Since in the laptop computer, the both sides of the liquid crystal display panel are fixed on the pair of brackets only by a plurality of screws, the assembly tolerance between the liquid crystal display panel and the pair of brackets cannot be controlled easily.

SUMMARY OF THE INVENTION

An objective of the present invention is to provide a panel assembly structure suitable for assembling a liquid crystal display panel on a panel cover of the laptop computer.

In order to achieve the above or other objectives, the present invention provides a panel assembly structure suitable for assembling a panel on an inner surface of a panel cover. The panel assembly structure comprises a first connecting portion, a first screw, a second connecting portion, and a second screw. The first connecting portion is integrally formed on the inner surface of the panel cover and extends toward a first side of the panel, and has a first connecting through hole. The first screw is screwed into the first connecting through hole and a first panel threaded hole disposed on the first side of the panel for fastening the first connecting portion and the first side of the panel together. The second connecting portion is integrally formed on the inner surface of the panel cover and extends toward a second side corresponding to the first side of the panel, and has a second connecting through hole. The second screw is screwed into the second connecting through hole and a second panel threaded hole disposed on the second side of the panel for fastening the second connecting portion and the second side of the panel together.

In an embodiment of the present invention, the above-mentioned panel assembly structure further comprises an elastic washer placed between the first connecting portion and the first side of the panel and having a washer through hole. The first screw is screwed into the first connecting through hole, the washer through hole, and the first panel threaded hole in sequence.

In an embodiment of the present invention, two ends of the above-mentioned elastic washer respectively have a first engaged portion, and two sides of the first connecting portion respectively have a second engaged portion suitable for being clipped to the corresponding first engaged portion, so as to restrict the position of the elastic washer relative to the first connecting portion.

In an embodiment of the present invention, the above-mentioned elastic washer has a sleeve with the above-mentioned washer through hole.

In an embodiment of the present invention, the above-mentioned panel assembly structure further comprises a buffer member with a buffer through hole. The buffer member is disposed on the outer edge of the sleeve through the buffer through hole and placed between the elastic washer and the first connecting portion. In addition, the above-mentioned buffer member can be a spring or a rubber.

In an embodiment of the present invention, the above-mentioned panel assembly structure further comprises a buffer member placed between the first side of the panel and the first connecting portion. In addition, the buffer member can have a buffer through hole, and the first screw is screwed into the first panel threaded hole through the first connecting through hole and the buffer through hole. Further, the above-mentioned buffer member can be a spring or a rubber.

In order to achieve the above or other objects, the present invention provides a panel assembly structure suitable for assembling a panel to a panel cover. The panel assembly structure comprises a pair of screws respectively disposed on two corresponding sides of the panel cover for fixing the panel placed between the two corresponding sides of the panel cover on the panel cover.

In an embodiment of the present invention, the panel assembly structure further comprises an elastic washer placed between the head of one of the pair of screws and one side of the panel corresponding to the screw.

In an embodiment of the present invention, two ends of the above-mentioned elastic washer respectively have a first engaged portion. The side of the panel cover where the elastic washer is placed has a connecting portion. Two sides of the connecting portion respectively have a second engaged portion suitable for being clipped to the corresponding first engaged portion, so as to restrict the position of the elastic washer corresponding to the connecting portion.

In an embodiment of the present invention, the above-mentioned elastic washer has a sleeve having a washer through hole. The screw is screwed into the washer through hole.

In an embodiment of the present invention, the above-mentioned panel assembly structure further comprises a buffer member having a buffer through hole. The buffer member is disposed on the outer edge of the sleeve through the buffer through hole, and is placed between the elastic washer and the connecting portion. The above-mentioned buffer member can be a spring or a rubber.

In an embodiment of the present invention, the above-mentioned panel assembly structure further comprises a buffer member placed between one side of the panel and the connecting portion. In addition, the connecting portion has a connecting through hole, and the buffer member has a buffer through hole. The corresponding side of the panel has a panel threaded hole. The first screw is screwed into the panel threaded hole through the connecting through hole and the buffer through hole. Further, the buffer member can be a spring or a rubber.

In view of the above, the panel assembly structure of the present invention utilizes the connecting portions directly formed on the panel cover of the electronic device with the screws for fixing the liquid crystal display panel on the panel cover. Therefore, there is no need to use the conventional brackets for fixing the panel on the cover, and the weight of members used for fixing the panel can be reduced. Thus, the electronic device may be gradually developed towards a trend of lightweight.

In addition, an elastic washer may be selectively disposed between the above-mentioned first connecting portion and the side of the panel for eliminating the width tolerance of panel. Further, a buffer member may be selectively disposed between the elastic washer and the above-mentioned first connecting portion, or disposed between the side of the panel and the connecting portion, to provide a proper stress buffer to protect the panel from being damaged.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

The panel assembly structure of the present invention may be used to assemble a display panel on the inner surface of a cover of the electronic device. In the present embodiment, a laptop computer and a liquid crystal display panel assembled on the panel cover of the laptop computer are taken as an example for illustration. In addition, the panel assembly structure of the present invention can also be applied to other electronic devices having display panels, such as mobile phones, language translators, digital cameras, digital video cameras, personal digital assistants and so on.

Figure 2A:
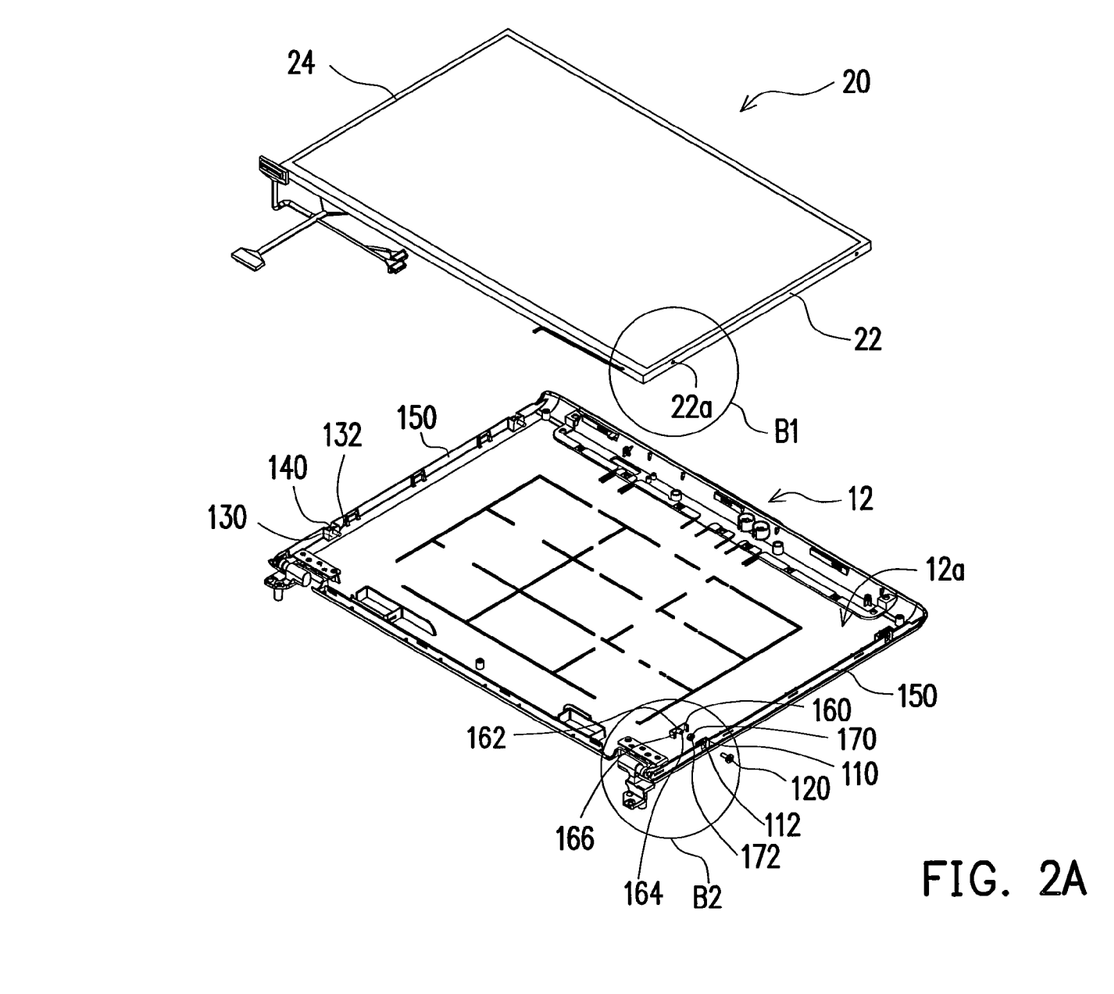
FIGS. 2A and 2B are a three-dimensional view and a top view of a panel assembly structure of the present invention before assembled, respectively.
Figure 2B:
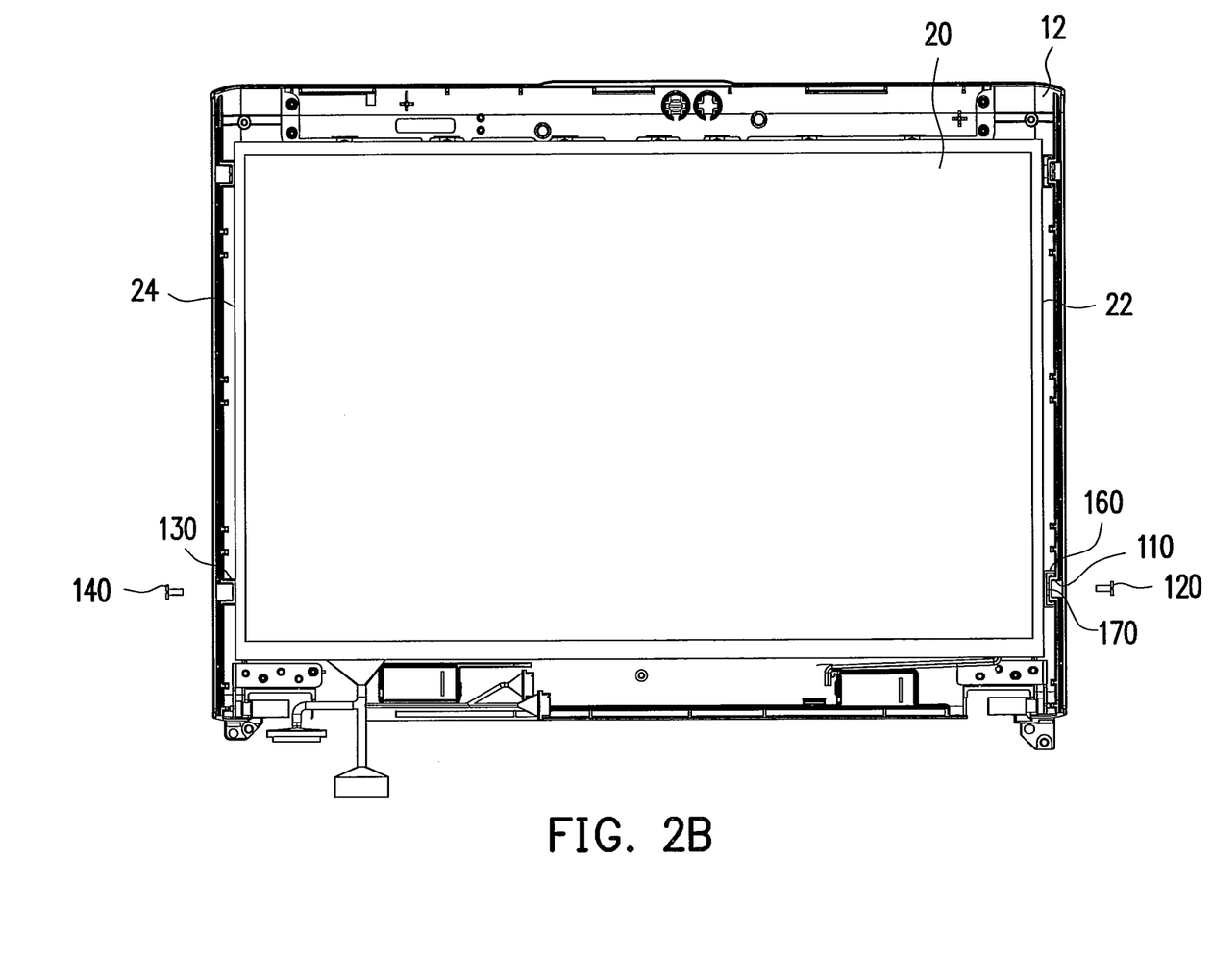
Figure 2C:
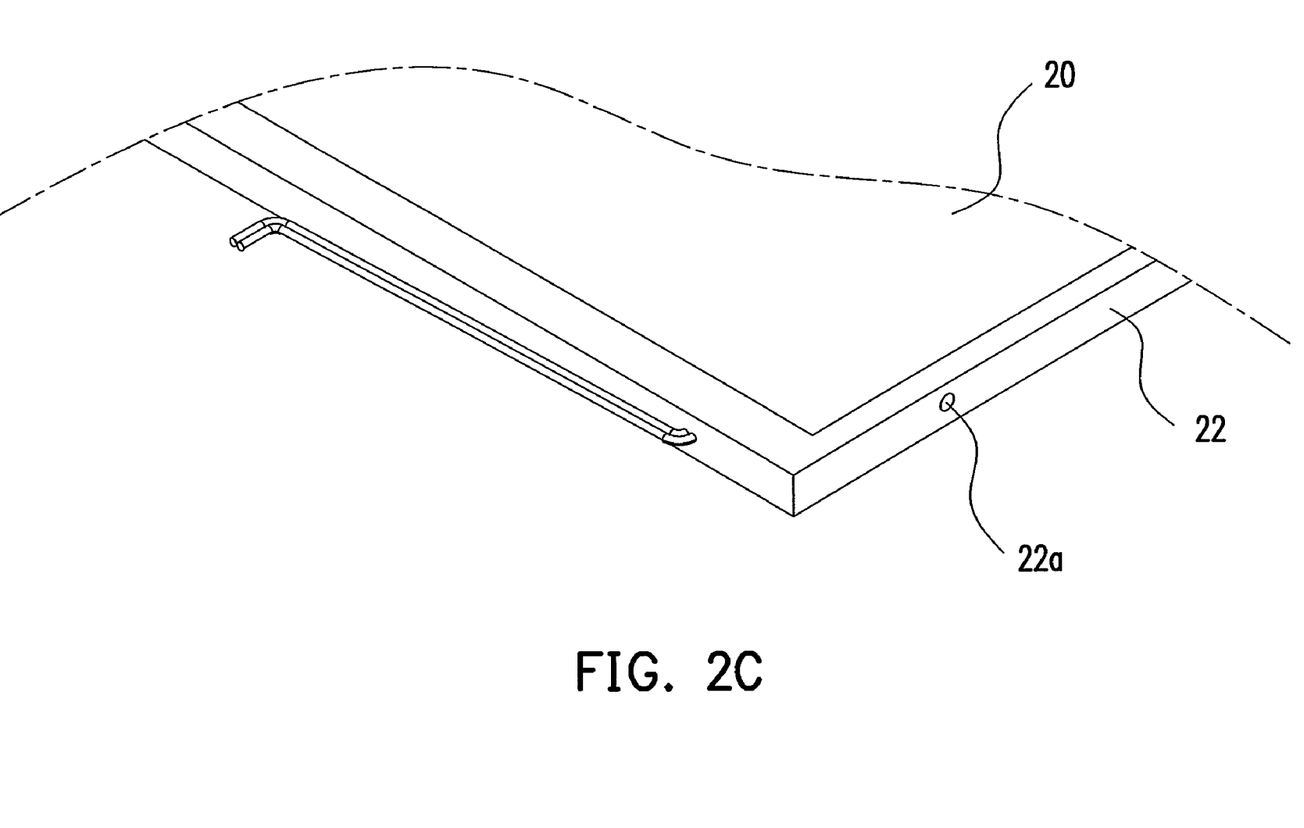
FIGS. 2C and 2D are enlarged views of the Region B1 and the Region B2 shown in FIG. 2A, respectively.
Figure 2D:
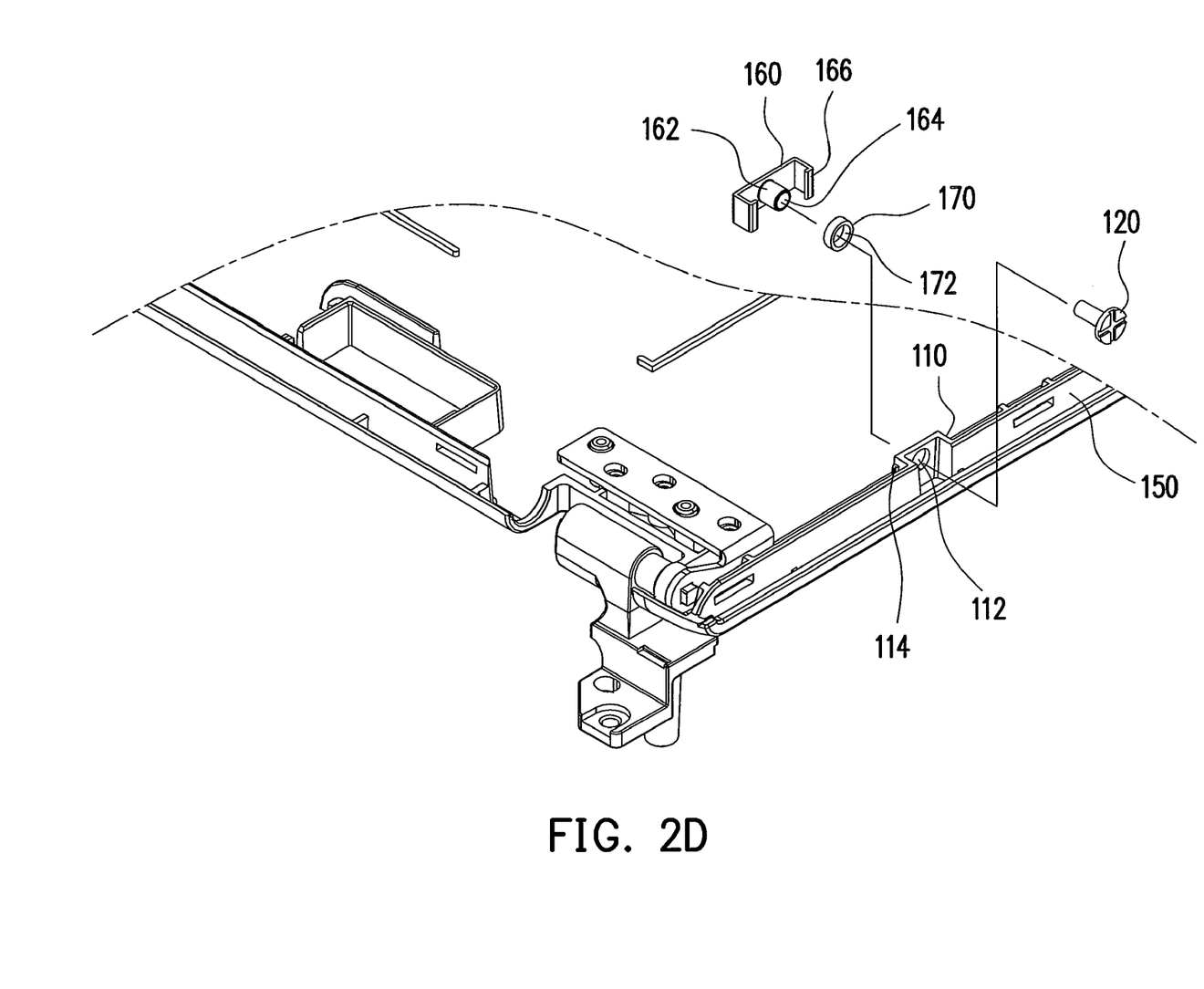
Figure 3A:
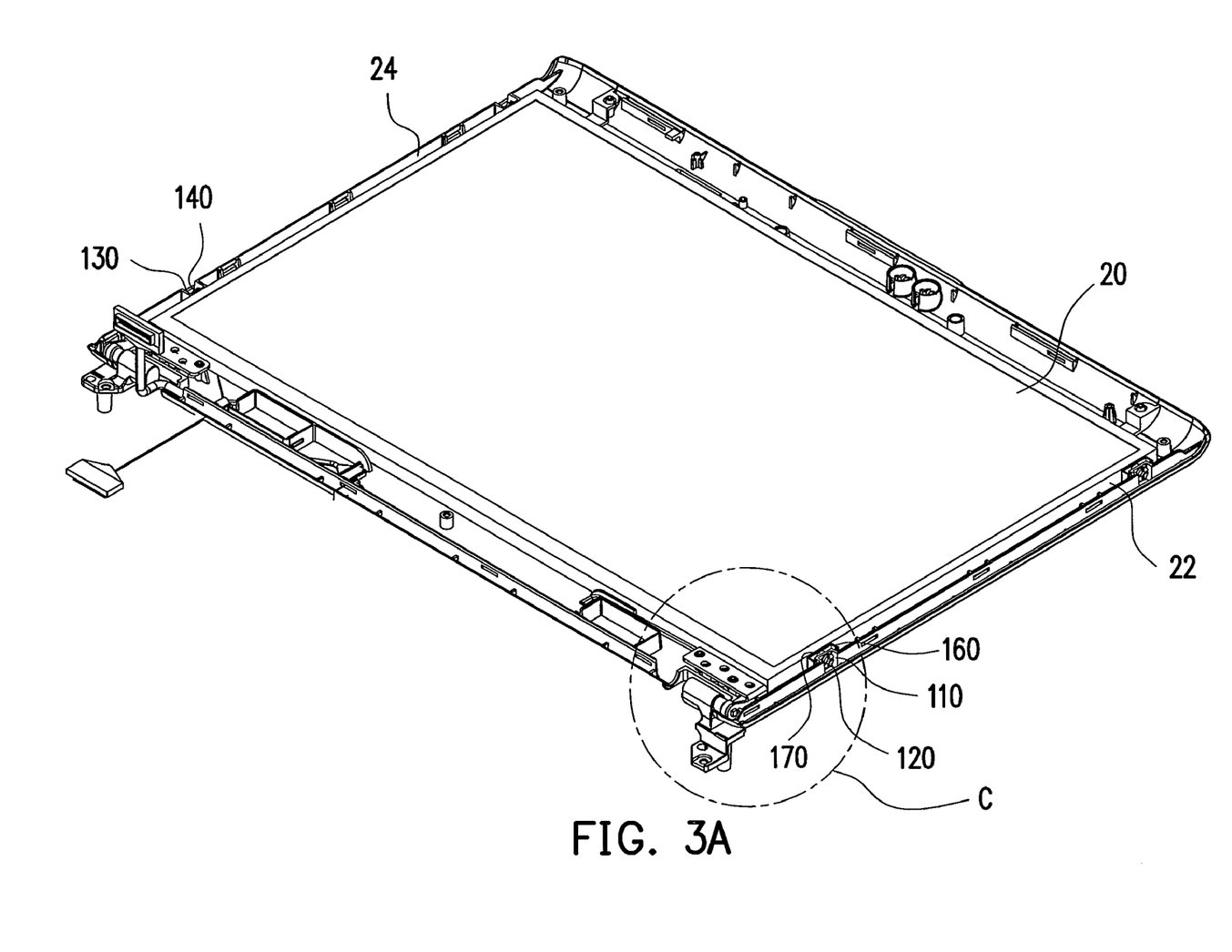
FIGS. 3A and 3B are a three-dimensional view and a top view of the panel assembly structure of the present invention after assembled, respectively.
Figure 3B:
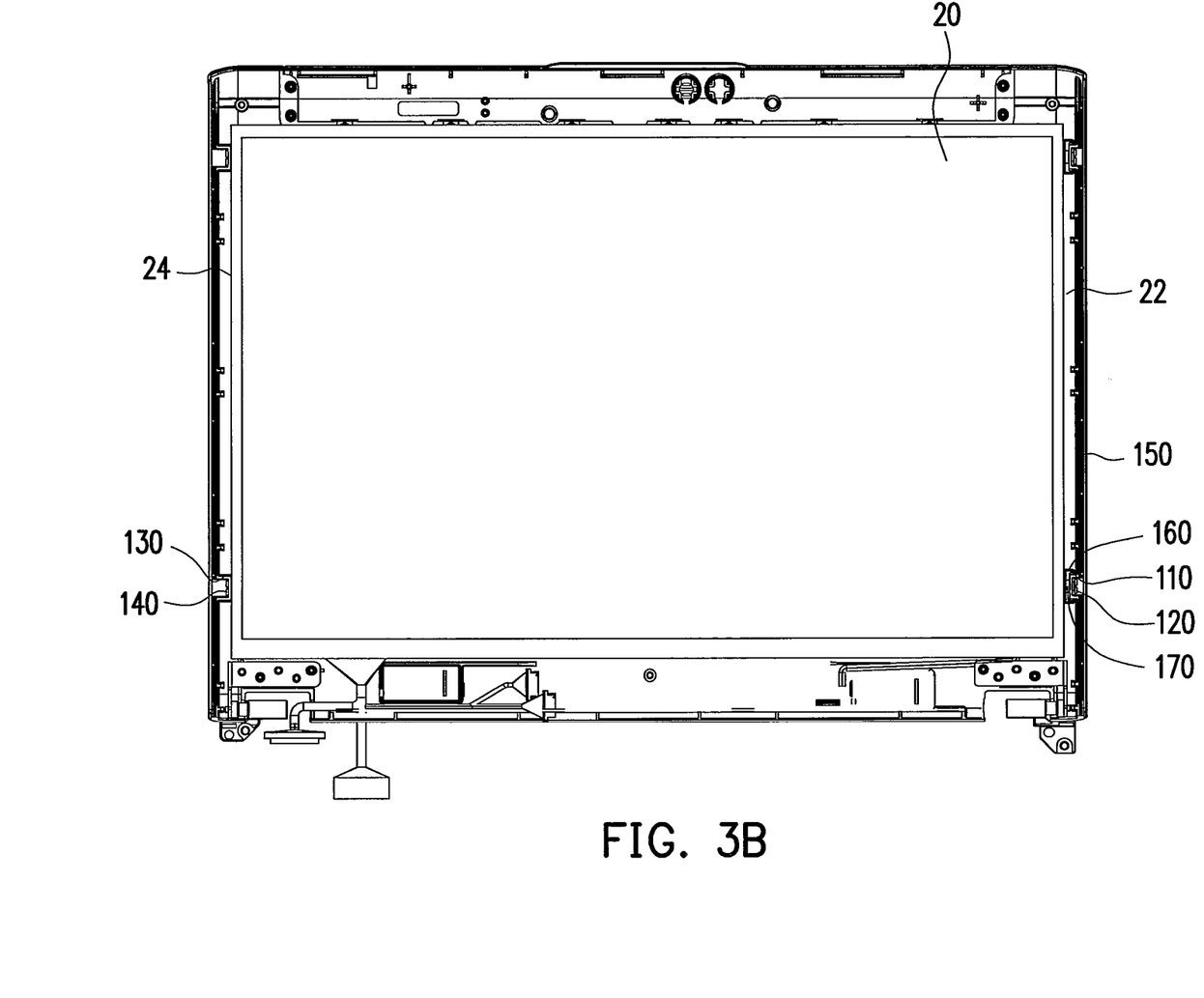
Figure 3C:
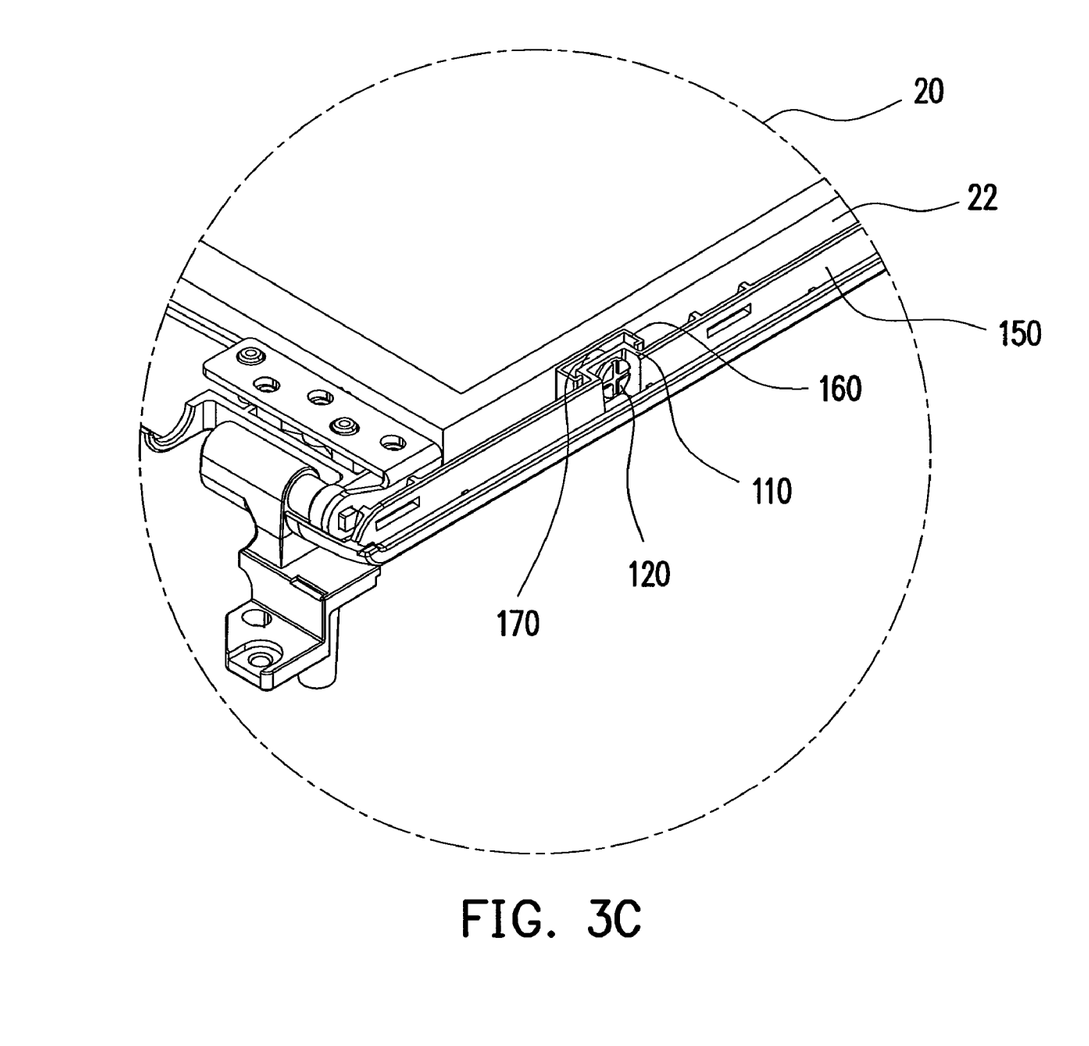
FIGS. 3C and 3D are a three-dimensional view and a sectional view of the Region C in FIG. 3A, respectively.
Figure 3D:
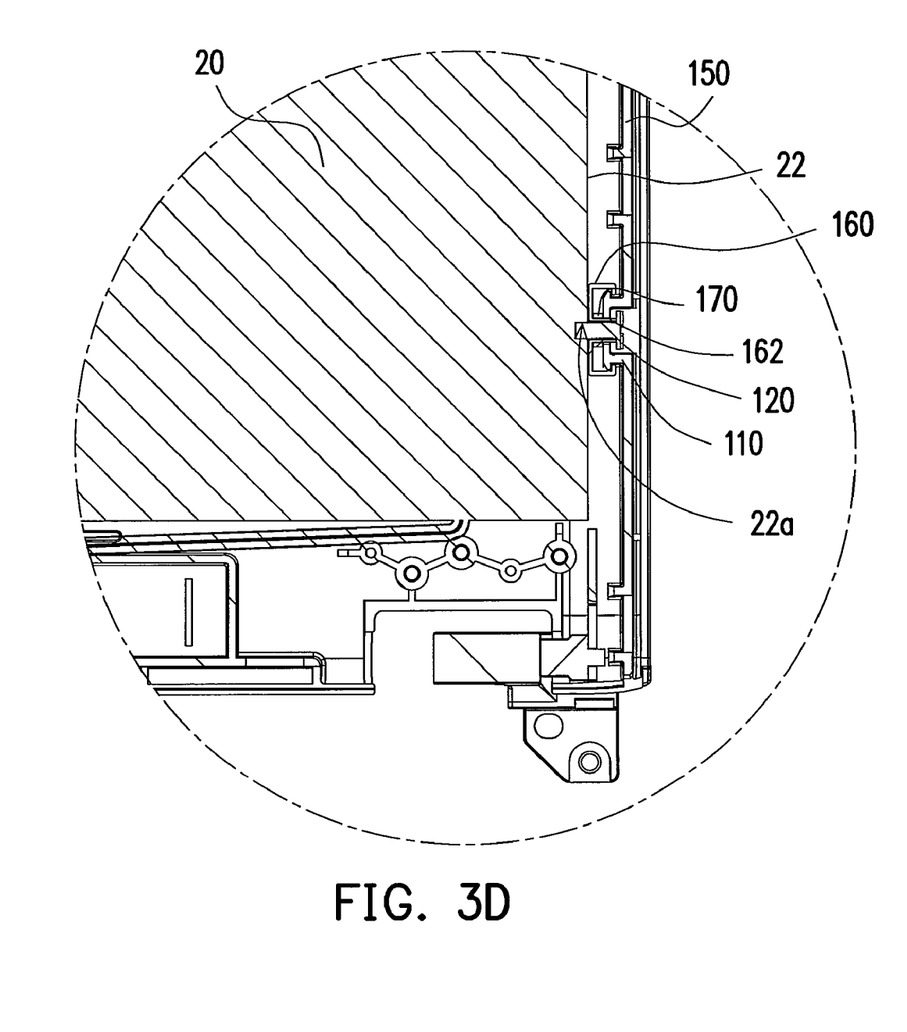

FIGS. 2A and 2B are respectively a three-dimensional view and a top view of a panel assembly structure before a panel is assembled to the cover according to an embodiment of the present invention. FIGS. 2C and 2D are the enlarged views of the Region B1 and the region B2 in FIG. 2A, respectively. FIGS. 3A and 3B are a three-dimensional view and a top view of the panel assembly structure in FIGS. 2A and 2B after the panel is assembled to the cover, respectively. FIGS. 3C and 3D are an enlarged view and a sectional view of the Region C in FIG. 3A, respectively.

Referring to FIGS. 2A to 2C and FIGS. 3A to 3D, the panel assembly structure of the present invention is suitable for assembling a liquid crystal display panel 20 on an inner surface 12a of a panel cover 12 of a laptop computer. The liquid crystal display panel 20 has a first side 22 and a second side 24 parallel to the first side 22. A first panel threaded hole 22a and a second panel threaded hole (not shown) are respectively disposed on the first side 22 and the second side 24. The panel assembly structure of the present embodiment mainly comprises a first connecting portion 110, a first screw 120, a second connecting portion 130, and a second screw 140.

The first connecting portion 110 is integrally formed on the inner surface 12a of the panel cover 12 and extends toward the first side 22 of the liquid crystal display panel 20, and has a first connecting through hole 112 for the first screw 120 to pass through. The first screw 120 is screwed into the first connecting through hole 112 of the first connecting portion 110 and the first panel threaded hole 22a of the liquid crystal display panel 20 to fasten the first connecting portion 110 formed on the panel cover 12 and the first side 22 of the liquid crystal display panel 20 together.

Similarly, the second connecting portion 130 is integrally formed on the inner surface 12a of the panel cover 12 and extends toward the second side 24 of the liquid crystal display panel 20, and has a second connecting through hole 132 for the second screw 140 to pass through. The second screw 140 is screwed into the second connecting through hole 132 of the second connecting portion 130 and the second panel threaded hole (not shown) of the liquid crystal display panel 20 to fasten the second connecting portion 130 formed on the panel cover 12 and the second side 24 of the liquid crystal display panel 20 together.

Thus, the liquid crystal display panel 20 can be fixed on the panel cover 12 by the connecting portions 110 and 130 together with the screws 120 and 140. Therefore, there is no need to use a pair of brackets for fixing the liquid crystal display panel on the cover, thus reducing the weight of the laptop computer.

The position and number of the connecting portions and screws are not limited to those described in the present embodiment. In addition, supporting ribs 150 can be used to connect the first connecting portions 110 or the second connecting portions 130 to enhance the structure strength.

In order to eliminate the width tolerance of the liquid crystal display panel 20 and prevent force from focusing on the front end of the screw 120 in the screwing process which causes damage to the bracket 30 of the liquid crystal display panel 20 and even causes distortion thus resulting in ripples generated on the liquid crystal display panel 20, in an embodiment of the present invention, an elastic washer 160 can be selectively disposed between the first connecting portion 110 and the first side 22 of the liquid crystal display panel 20. The elastic washer 160 converts the force of screwing the screw 120 from single force to plane force, thus evenly distributing the force on the bracket 30 of the liquid crystal display panel 20 and ensuring the security of the liquid crystal display panel 20. The elastic washer 160 has a sleeve 162 disposed in the first connecting through hole 112, and the sleeve 162 further has a washer through hole 164. After fixing the second side 24 of the liquid crystal display panel 20 to the second connecting portion 130 and before fixing the first side 22 on the panel cover 12, the first screw 120 is sequentially screwed into the first connecting through hole 112, the washer through hole 164, and the first panel threaded hole 22a. The elastic washer 160 is fastened to the liquid crystal display panel 20 by the first screw 120, such that the sleeve 162 of the elastic washer 160 can slide in the first connecting through hole 112 and the width tolerance of the liquid crystal display panel 20 can be eliminated.

In order to temporarily fix the elastic washer 160 on the first connecting portion 110 before combining the first connecting portion 110 and the elastic washer 160, two ends of the elastic washer 160 can be respectively disposed with a first engaged portion 166, and two ends of the first connecting portion 110 can be respectively disposed with a second engaged portion 114 corresponding to the first engaged portion 166. The second engaged portions 114 are suitable for respectively engaging the corresponding first engaged portions 166 so as to confine the position of the elastic washer 160 corresponding to the first connecting portion 110 and to temporarily fix the elastic washer 160 to the first connecting portion 110.

In addition, in order to provide a proper stress buffer to protect the liquid crystal display panel 20 from being damaged and further distribute the force applied to the liquid crystal display panel 20 and exerted by the screw 120, the present invention can further dispose a buffer member 170 having a buffer through hole 172 between the elastic washer 160 and the first connecting portion 110. The buffer member 170 is disposed on the outer edge of the sleeve 162 through the buffer through hole 172 so as to be placed between the elastic washer 160 and the first connecting portion 110. The above-mentioned buffer member 170 can be elastic members such as spring or rubber.

Figure 4A:
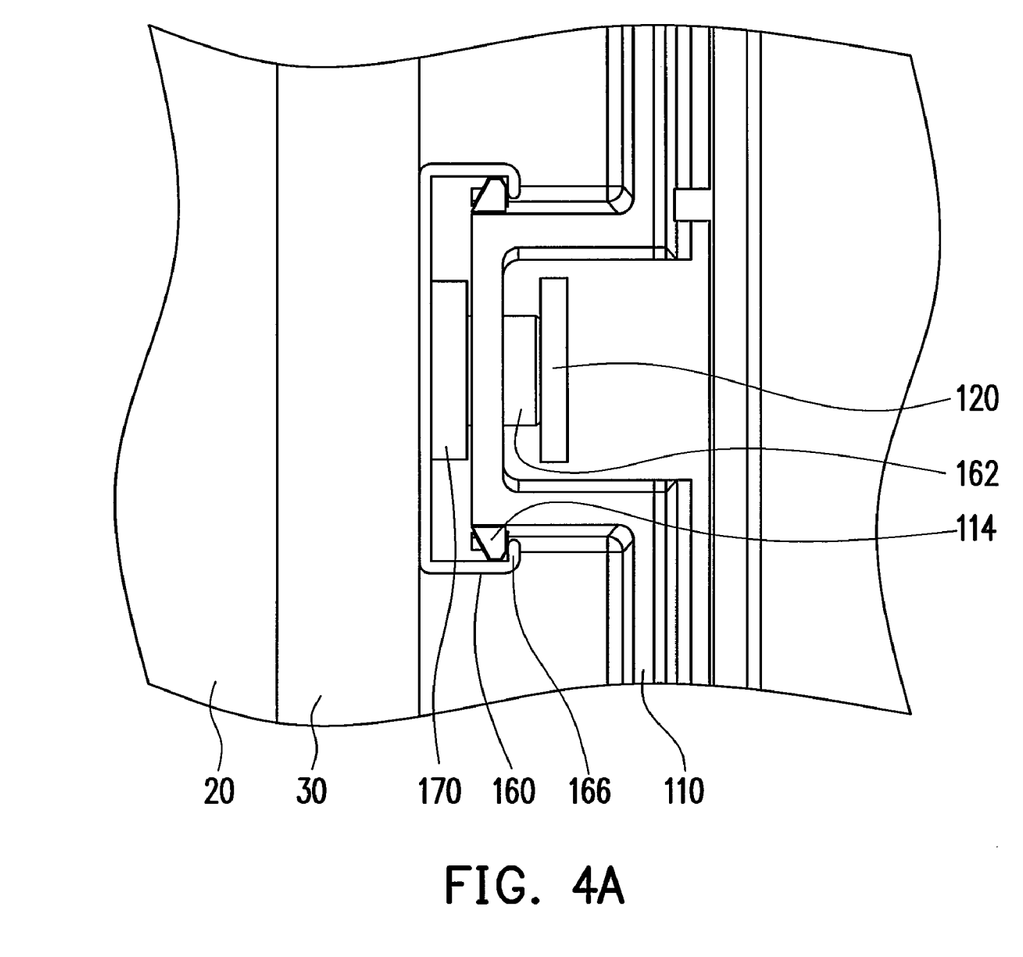
FIGS. 4A and 4B are partial top views of the bracket fixed on the liquid crystal display panel by the first screw, the elastic washer, and the buffer member when the width of the liquid crystal display panel is narrower and wider, respectively.
Figure 4B:
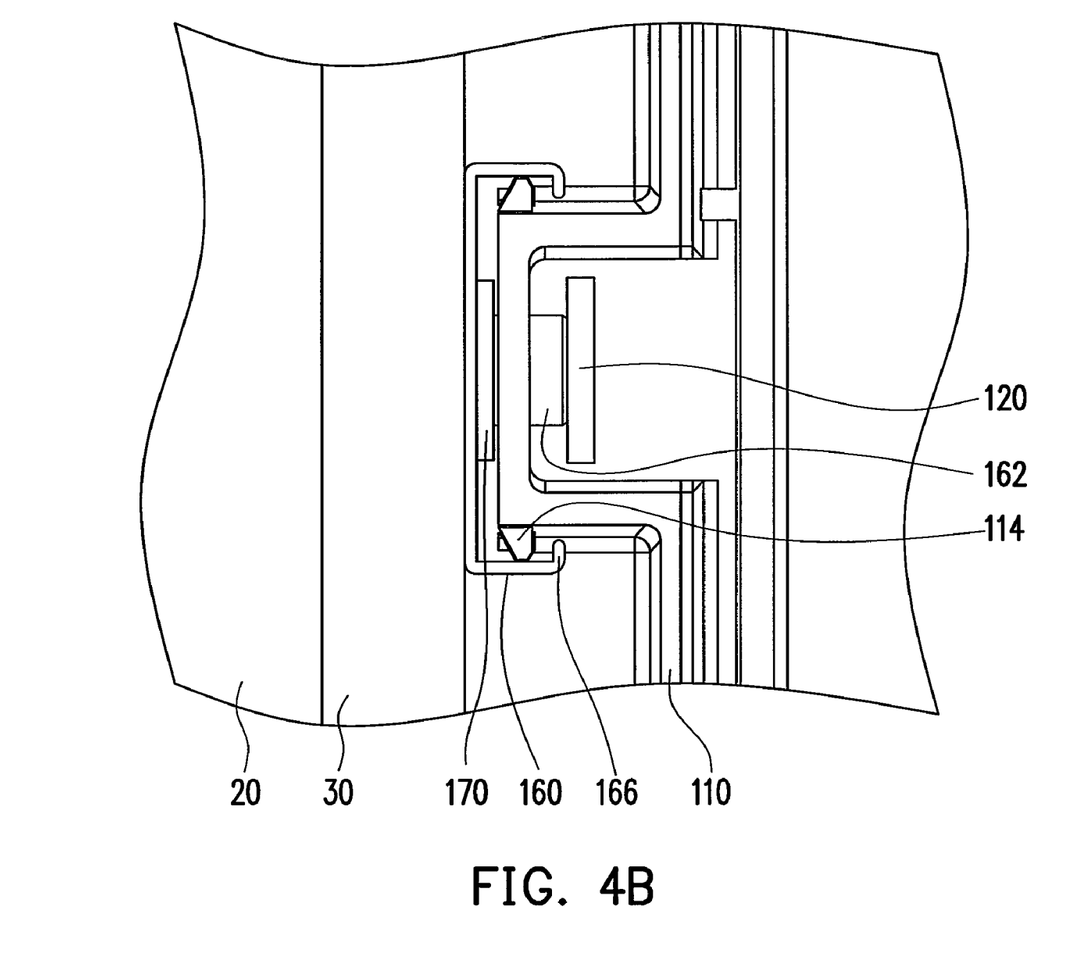

FIGS. 4A and 4B are partial top views of the bracket fixed on the liquid crystal display panel by the first screw, the elastic washer, and the buffer member when the width of the liquid crystal display panel is narrower and wider, respectively. As shown in FIGS. 4A and 4B, when the width of the liquid crystal display panel 20 assembled on the panel cover is narrower, the buffer member 170 is not compressed, and the first engaged portions 166 at two ends of the elastic washer 160 are clipped to the second engaged portions 114 of the first connecting portion 110. Otherwise, when the width of the liquid crystal display panel 20 is wider, the elastic washer 160 moves toward the first connecting portion 110 and compresses the buffer member 170 to deform it. The present invention eliminates the width tolerance of the liquid crystal display panel 20 by the arrangement of the elastic washer 160 and the buffer member 170.

In addition, according to another embodiment of the present invention (not shown), the above-mentioned buffer member 170 can be directly disposed between the first side 22 of the liquid crystal display panel 20 and the first connecting portion 110 to omit the above-mentioned elastic washer 160. Therefore, when the first screw 120 is screwed into the first panel threaded hole 22a through the first connecting through hole 112 and the buffer through hole 172, the buffer member 170 can also eliminate the width tolerance of the liquid crystal display panel 20 at the same time.

In summary, the panel assembly structure of the present invention has the following advantages:

1. The panel assembly structure of the present invention utilizes the connecting portions directly formed on the panel cover of the electronic device with the screws for fixing the liquid crystal display panel on the panel cover. Therefore, there is no need to use the conventional brackets for fixing the panel on the cover, and the weight of members used for fixing the panel can be reduced. Thus, the electronic device may be gradually developed towards a trend of lightweight.

2. In the present invention, an elastic washer may be disposed between the connecting portion and the side of the panel for eliminating the width tolerance of the panel.

3. In the present invention, a buffer member may be selectively disposed between the elastic washer and the connecting portion Besides, a buffer member may be disposed directly between the side of the panel and the connecting portion to provide a proper stress buffer to protect the panel from damage.

4. Since the panel may be fixed on the panel cover directly by connecting portions together with screws in the present invention, the panel assembly process can be simplified, thus improving the reliability of the liquid crystal display panel module after assembled.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A panel assembly structure suitable for assembling a panel on an inner surface of a panel cover, the panel assembly structure comprising:

a first connecting portion, integrally formed on the inner surface of the panel cover and extending toward a first side of the panel and having a first connecting through hole;

a first screw, screwed into the first connecting through hole and a first panel threaded hole of the first side of the panel for fastening the first connecting portion and the first side of the panel together;

a second connecting portion, integrally formed on the inner surface of the panel cover and extending toward a second side corresponding to the first side of the panel and having a second connecting through hole;

a second screw, screwed into the second connecting through hole and a second panel threaded hole of the second side of the panel for fastening the second connecting portion and the second side of the panel together; and an elastic washer, placed between the first connecting portion and the first side of the panel and having a washer through hole, wherein the first screw is sequentially screwed into the first connecting through hole, the washer through hole, and the first panel threaded hole, and two ends of the elastic washer have a first engaged portion, respectively, and both sides of the first connecting portion have a second engaged portion, respectively, for being clipped to the corresponding first engaged portion, so as to restrict the position of the elastic washer relative to the first connecting portion.

2. The panel assembly structure as claimed in claim 1, wherein the elastic washer has a sleeve having the washer through hole.

3. The panel assembly structure as claimed in claim 2, further comprising:

a buffer member, having a buffer through hole, wherein the buffer member is disposed on the outer edge of the sleeve through the buffer through hole and is placed between the elastic washer and the first connecting portion.

4. The panel assembly structure as claimed in claim 3, wherein the buffer member is a spring or a rubber.

5. The panel assembly structure as claimed in claim 1, further comprising:

a buffer member, placed between the first side of the panel and the first connecting portion.

6. The panel assembly structure as claimed in claim 5, wherein the buffer member has a buffer through hole, and the first screw is screwed into the first panel threaded hole through the first connecting through hole and the buffer through hole.

7. The panel assembly structure as claimed in claim 6, wherein the buffer member is a spring or a rubber.

8. A panel assembly structure suitable for assembling a panel to a panel cover, the panel assembly structure comprising:

a pair of screws respectively disposed on two corresponding sides of the panel cover, for fixing the panel placed between the two corresponding sides of the panel cover on the panel cover; and an elastic washer placed between a head of one of the pair of screws and one side of the panel corresponding to the screw, wherein two ends of the elastic washer have a first engaged portion, respectively, the side of the panel cover where the elastic washer is placed has a connecting portion, and both sides of the connecting portion respectively have a second engaged portion suitable for being clipped to the corresponding first engaged portion, so as to restrict the position of the elastic washer relative to the connecting portion.

9. The panel assembly structure as claimed in claim 8, wherein the elastic washer has a sleeve having a washer through hole, and the screw is screwed into the washer through hole.

10. The panel assembly structure as claimed in claim 9, further comprising:

a buffer member, having a buffer through hole, wherein the buffer member is disposed on the outer edge of the sleeve through the buffer through hole and is placed between the elastic washer and the connecting portion.

11. The panel assembly structure as claimed in claim 10, wherein the buffer member is a spring or a rubber.

12. The panel assembly structure as claimed in claim 8, further comprising:

a buffer member, placed between the first side of the panel and the connecting portion.

13. The panel assembly structure as claimed in claim 12, wherein the connecting portion has a connecting through hole, the buffer member has a buffer through hole, the corresponding side of the panel has a panel threaded hole, and the first screw is screwed into the panel threaded hole through the connecting through hole and the buffer member through hole.

14. The panel assembly structure as claimed in claim 13, wherein the buffer member is a spring or a rubber.

* * * * *

UNITED STATES PATENT AND TRADEMARK OFFICE
CERTIFICATE OF CORRECTION

PATENT NO. : 7,609,529 B2 Page 1 of 1
APPLICATION NO. : 11/456212
DATED : October 27, 2009
INVENTOR(S) : Chiang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 610 days.

Signed and Sealed this

Fourteenth Day of December, 2010

David J. Kappos
*Director of the United States Patent and Trademark Office*